Nov. 2, 1965 D. J. HAYMAN ETAL 3,214,913

HYDRAULIC MASTER CYLINDER

Filed Nov. 21, 1961 4 Sheets-Sheet 1

INVENTORS
DENNIS J. HAYMAN
RAYMOND L. ENSINGER
BY
Walter Potoroka, Jr.
ATTORNEY

Nov. 2, 1965 D. J. HAYMAN ETAL 3,214,913

HYDRAULIC MASTER CYLINDER

Filed Nov. 21, 1961 4 Sheets-Sheet 2

INVENTORS
DENNIS J. HAYMAN
RAYMOND L. ENSINGER
BY
Walter Potoroka, Sr.
ATTORNEY

INVENTORS
DENNIS J. HAYMAN
RAYMOND L. ENSINGER
BY
Walter Potoroka, Sr.
ATTORNEY

Nov. 2, 1965 D. J. HAYMAN ETAL 3,214,913

HYDRAULIC MASTER CYLINDER

Filed Nov. 21, 1961 4 Sheets-Sheet 4

INVENTORS
DENNIS J. HAYMAN
RAYMOND L. ENSINGER
BY
Walter Potoroka, Sr.
ATTORNEY

United States Patent Office
3,214,913
Patented Nov. 2, 1965

3,214,913
HYDRAULIC MASTER CYLINDER

Dennis J. Hayman, East Detroit, and Raymond L. Ensinger, Detroit, Mich., assignors to Holley Carburetor Company, Warren, Mich., a corporation of Michigan
Filed Nov. 21, 1961, Ser. No. 153,939
13 Claims. (Cl. 60—54.6)

This invention relates generally to hydraulic brake systems, and more particularly to an improved two-stage master cylinder for such brake systems.

Hydraulic brake systems including a master cylinder with a two-diameter piston for two-stage operation were known prior to 1930, as shown by Engel 1,892,335 which is believed to be one of the earliest patents covering this particular art. Since that time, many additional patents involving various two-stage brake master cylinder constructions have issued.

The use of a two-diameter piston, or two pistons of different diameters, enables an initial movement of a large volume of hydraulic fluid under a relatively low pressure for bringing the brake shoes into contact with the brake drums and a subsequent movement of a relatively small volume of fluid under high pressure for actually applying the braking force. Various means have been disclosed for rendering the low pressure piston ineffective upon the creation of a predetermined pressure, as well as for effecting a smooth transition from low to high pressure operation.

However, it is important to note that none of the previously proposed two-stage master cylinders has ever reached wide and lasting commercial useage. One of the reasons for this lack of interest could very well be an inherent disadvantage which is prevalent in all two-stage master cylinders proposed to date, i.e., the possibility of excessive pressures accumulating in the lines leading from the high pressure end of the master cylinder and to the wheel cylinders. Unless some provision is made for preventing such excessive pressures from occurring, an extremely rugged hydraulic line and wheel cylinder system would be required. Otherwise, it is conceivable and very possible that under certain circumstances the hydraulic lines of such a two-stage system could burst, resulting in an obviously hazardous complete loss of braking.

None of the two-stage brake constructions proposed to date appears to be concerned with this problem, since each completely entraps the high pressure hydraulic fluid in front of the small diameter piston until such time as the piston is allowed to retract by the withdrawal of the operator's foot from the brake foot pedal. This very unsatisfactory and highly unsafe characteristic of prior two-stage master cylinders is very effectively eliminated by this invention.

Regardless of the type of master cylinder employed, it is common practice to provide a pressure responsive stop-light switch on the wheel cylinder side of the piston so that the vehicle stop-light will operate when the brake foot pedal is operated. These pressure responsive switches are rather fragile and subject to failure, in which case a trailing motorist is not warned that the vehicle ahead is being braked and the brakes could actually fail completely. None of the previously proposed two-stage master cylinder constructions considered the desirability of eliminating such switch failures, especially if this switch were connected in the high pressure, second-stage hydraulic circuit. This invention also eliminates the above problem by connecting the stop-light switch in the first stage, low pressure circuit.

As in the case of all prior two-stage hydraulic pressure producing devices, a general object of this invention is to provide a fluid brake master cylinder in which a large volume of fluid is first moved under a relatively low pressure to bring all brake shoes into contact with the brake drums, after which a small volume of fluid is moved under high pressure to apply the braking force.

A more specific object of this invention is to provide a two-stage hydraulic brake master cylinder or system which includes means for eliminating the possibility of excessive pressure build-up in the hydraulic line and wheel cylinder system when the brake is being applied.

A further object of this invention is to provide such a system which has additional means for preventing any pressure build-up from other causes, such as expansion of the fluid in the lines and wheel cylinders due to heat or leakage into the lines past the above mentioned pressure limiting means.

A still further object of this invention is to provide such a system which contains both of the above mentioned means for preventing build-up of excessive pressures in the lines and wheel cylinders, regardless of the cause.

Another object of this invention is to provide a two-stage cylinder system which is simple in structure, economical to manufacture, durable in use and automatic in operation.

A still further object of this invention is to provide a two-stage brake master cylinder system having a stop-light switch connected in the low pressure circuit.

Other objects and advantages of the invention will become more apparent when reference is made to the following specification and the accompanying drawings wherein.

Figures 1, 2:
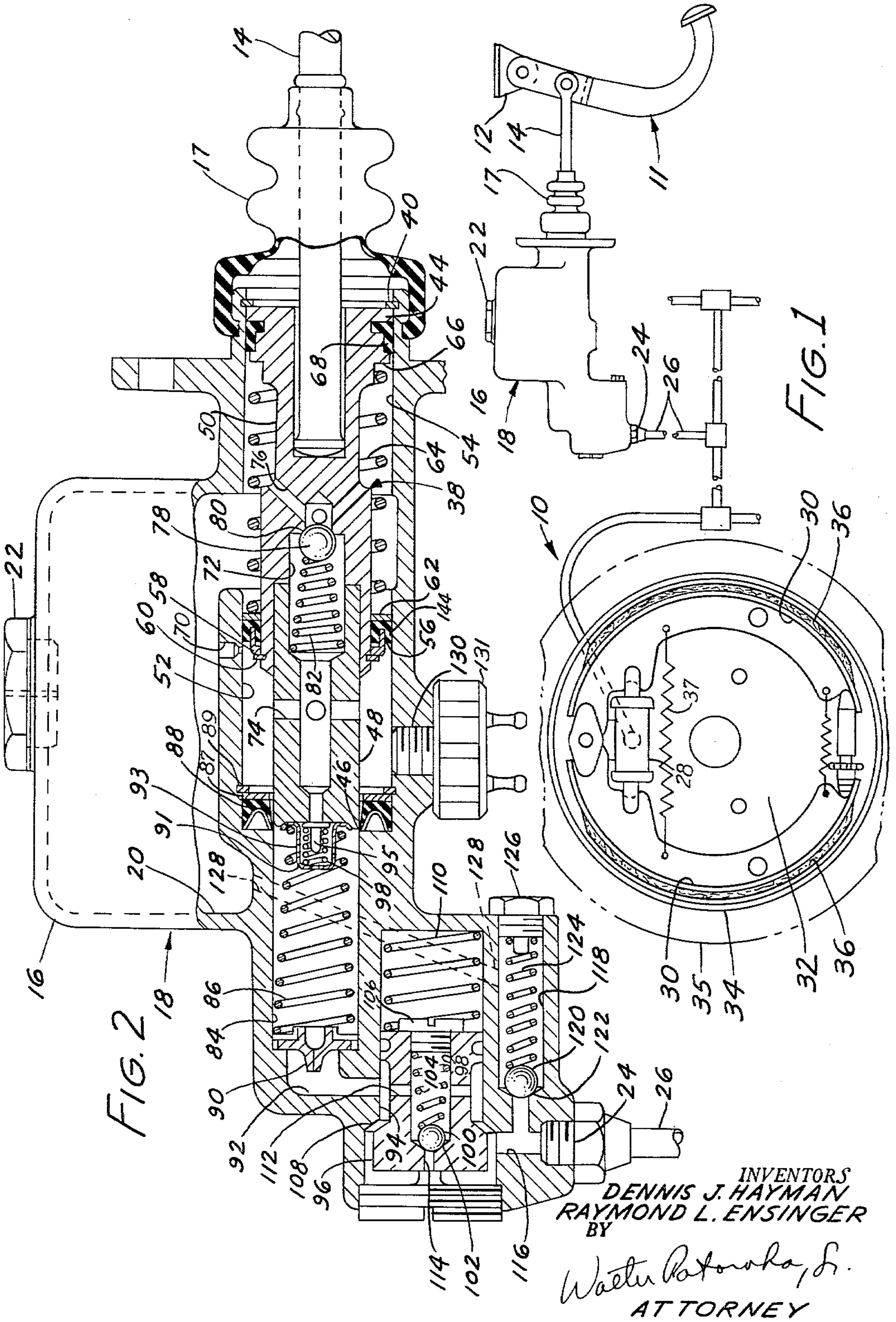
FIGURE 1 is a schematic illustration of a typical hydraulic brake system.
FIGURE 2 is a cross sectional view of a two-stage master cylinder that embodies the invention and that can be employed in the system shown by FIGURE 1.

Referring to the figures in greater detail, FIGURE 1 illustrates schematically a typical hydraulic brake system 10 having the usual foot pedal lever 11 pivotally connected to a fixed support 12. The actuating rod 14 pivotally connected to lever 11 extends into the master cylinder housing 16 through a flexible boot 17 removably connected to the rod 14 and housing 16 for the purpose of excluding dust and other foreign substances from the master cylinder 18. The master cylinder housing 16 includes the usual fluid reservoir 20 provided with a vented screw threaded plug or cap 22 which maintains the reservoir 20 at atmospheric pressure. At the exit end of the master cylinder 18 is a discharge port 24 which is connected via hydraulic pressure lines 26 to the usual four hydraulic pressure actuated wheel cylinders 28 associated with the brake shoes 30.

The brakes may be of any convventional type, and they would normally include a fixed backing plate 32, a rotatable drum 34 thereon secured for rotation with a wheel 35 to be braked, a pair of friction elements or shoes 36 pivotally secured to the backing plate 32 and cooperating with the drum 34, a retractile spring 37 connecting the shoes 30, and the wheel cylinder 28 mounted on the backing plate 32. The wheel cylinder is located between the shoes and connected thereto for actuating the shoes 30 into engagement with the drum 34 against the resistance of the retractile spring 37.

Looking now to FIGURE 2, the housing 16 includes concentric bores in which a two-diameter piston 38 is reciprocable and held against withdrawal by a retaining ring 40. Piston 38 contains a large diameter end 44, a small diameter end 46 and reduced body portions 48 and 50 which provide, in conjunction with the housing 16, annular chambers 52 and 54. These chambers 52 and 54 are separated by cup seal 56, spacer 58, retainer 60, and back-up ring 62. Preload spring 64 is contained in chamber 54 between back-up ring 62 and piston shoulder 66. Large end 44 of piston 38 is provided with a seal 68 disposed in an annular groove behind shoulder 66. Chamber 52 communicates with fluid reservoir 20 by way of port 70 and with piston internal chamber 72 by the way of ports 74. The piston internal chamber 72 further communicates with chamber 54, and hence with reservoir 20, by the way of ports 76. This access is closed off at times, as will be discussed in a later description of the operation, by check valve 78, held against seat 80 by spring 82.

The smaller housing bore forms chamber 84 with smaller piston end 46 reciprocable therein, the chamber 84 containing spring 86 interposed between piston end 46 and check valve 90. Biased against piston end 46 by spring 86 is a check valve housing 91 containing ports 93 and enclosing check valve 95 and check valve spring 98. Cup seal 88 is held in place at the junction between the low and high pressure chambers, 52 and 84, respectively, by back-up ring 87 and retainer 89. It should also be mentioned that cup seal 88, back-up ring 87 and retainer 89 could be eliminated, if replaced by the addition of a Teflon or other suitable ring on piston end 46 in a suitable recess thereon. The Teflon ring would thus move with the piston, and the same sealing function would be accomplished as with the use of cup seal 88.

Figure 4:
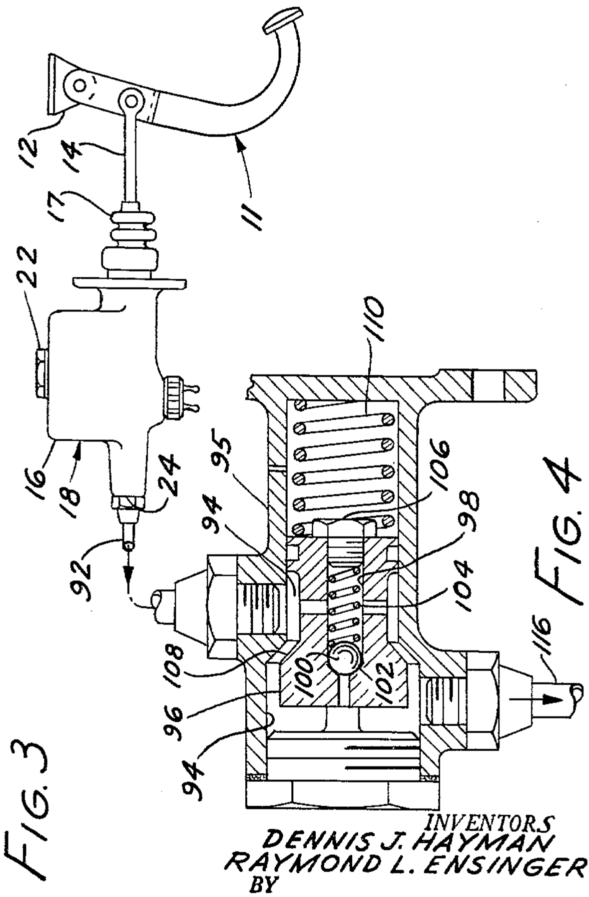
FIGURES 4, 5, 6 and 7 are cross-sectional views and/or side elevational view with portions thereof cut away and in cross-section illustrating four modifications of the invention.

Conduit 92 connects between check valve 90 and chamber 94, which may be either an integral part of housing 16 as shown in FIGURE 2 or a separate unit 95 as shown in FIGURE 4. Chamber 94 confines valve 96 having a central chamber 98 in which is enclosed check valve 100 normally biased against seat 102 by spring 103, the latter being held in place by plug 106. Valve 96 is biased away from seat 108 by spring 110. Chamber 98 communicates with chamber 94 by the way of ports 112, and at times by the way of port 114. Conduit 116 leads from chamber 94 to discharge port 24 and to pressure relief chamber 118, also an integral part of housing 16, wherein check valve 120 is biased against seat 122 by spring 124 retained within the chamber 118 by plug 126. Chamber 118 communicates with reservoir 20 by the way of bleed line 128.

*Operation*

FIGURE 2 shows the system in its inactive or repose position. Assuming now that the operator begins to apply the brakes, his depression of foot pedal lever 11 advances the master cylinder actuating rod 14, which in turn moves piston 38 forward, or to the left in FIGURE 2. Cup seal 56, spacer 58 and back-up ring 62 move with piston 38 as a unit until such time as cup seal 56 has passed port 70 and piston end 46 has moved through cup seal 88. When this occurs, fluid in chamber 52 passes through ports 74 into chamber 72 and thence past check valve 95 through ports 93 and into chamber 84, combining with the fluid in chamber 84 and thereby forcing it through the check valve 90. The fluid thus displaced into channel 92 by virtue of very low foot pedal force can be seen to be of a relatively large volume. This quickly takes up the slack in the system, since this high volume fluid enters channel 94 from conduit 92, passes valve seat 108, travels through conduit 116 to the discharge port 24, and thence to the brake cylinders, bringing the brake shoes quickly into contact with the brake drums. This phase of the operation is as depicted by curve OA of FIGURE 3.

Once the slack in the system has been thus taken up, the resultant predetermined pressure is counterbalanced by a preload spring 64. Spring 64 now begins to compress as piston 38 continues to move forward, sliding through cup seal 56. The larger diameter of piston 38 is thus rendered inoperative as a pressure building means, and the transition from low to high pressure producing means is complete. Further effective compression of the hydraulic fluid is now produced solely by the small piston diameter 46; thus, a small volume of fluid is now moved under high pressure to apply the braking force. This phase of operation is represented by curve AB of FIGURE 3.

Figure 3:
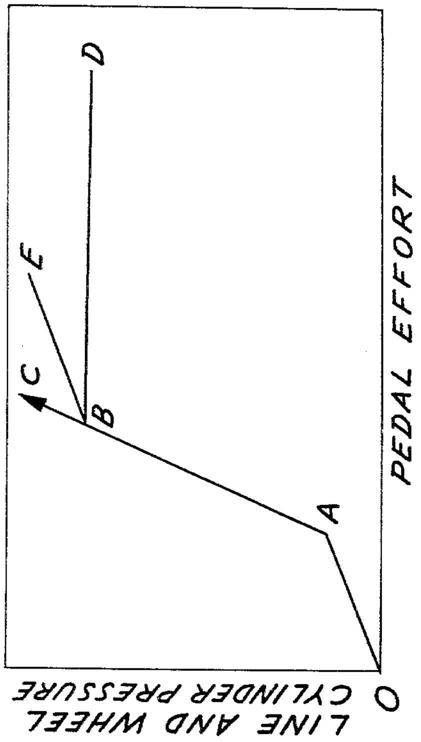
FIGURE 3 is a force-pressure curve demonstrating the differences in operation between the prior art devices and those embodying the invention.

In other two-stage systems proposed to date, the hydraulic fluid is entrapped in front of the small piston, and additional force on the brake foot pedal 10 would increase the braking pressure indefinitely, as long curve BC of FIGURE 3. In contrast to this, the invention herein proposed will prevent this possibility of extremely unsafe excess line pressure. This is accomplished when, at some predetermined maximum line pressure level, spring 110 is overcome and valve 96 is thus moved toward the right in FIGURE 2. When finally seated upon valve seat 108, valve 96 closes off further build-up of pressure, regardless of the incoming pressure. At this time, check valve 100 is seated against valve seat 102, thus cutting off any return flow through port 114. The resultant curve, insofar as the line and wheel cylinder circuit is concerned, would be as per line BD of FIGURE 3.

Upon release of the brake foot pedal, check valve 100 is unseated, allowing the pressure in conduit 116 and in the brake lines 26 to drop, thereby permitting valve 96 to leave seat 108. At the same time, piston 38 would retract, and fluid from reservoir 20 would flow through ports 76, past the check valve 78, through ports 74 and into chamber 52. The fluid from the brake lines 26 would thus be free to flow through the check valve 90 into chamber 84 and thence back past the end of piston 46 between it and cup seal 88 into chamber 52 and finally through the now uncovered port 70 to the reservoir 20.

It is interesting to note that, should there be some leakage in the lines 26 or wheel cylinders 28, the resultant reduced pressure would cause valve 96 to leave seat 108 until the pressure were again built up to the required level.

To further prevent the possibility of excess pressure in the circuit from additional factors such as heat expansion of the fluid, a relief valve circuit comprising check valve 120 and spring 124 in chamber 118 would come into play. It can be seen that this circuit could be set to operate just above the pressure level designated to activate valve 96. Thus any pressure build-up would overcome spring 124, unseat check valve 120 and bleed back to reservoir 20 through bleed line 128, as required to maintain the line and wheel cylinder pressure at a safe level, as along curve BD.

Since the higher operating pressures of the two-stage system would contribute to more stop-light switch failures than in the single stage brake systems, a conventional switch 131 would be located in any system at some outlet 130 in the secondary or low pressure area. This would definitely cut down on the number of failures now occurring even in single stage brake systems since the pressures employed therein are intermediate pressures that are necessarily higher than the pressure in the low pressure stage of a two-stage system.

Some possible modifications of this invention, as shown by FIGURES 5, 6, 7 and 8 will now be discussed. It will be seen that these modifications also have the feature of preventing the build-up of excess pressure in the line and wheel cylinder system.

Figures 5, 6:
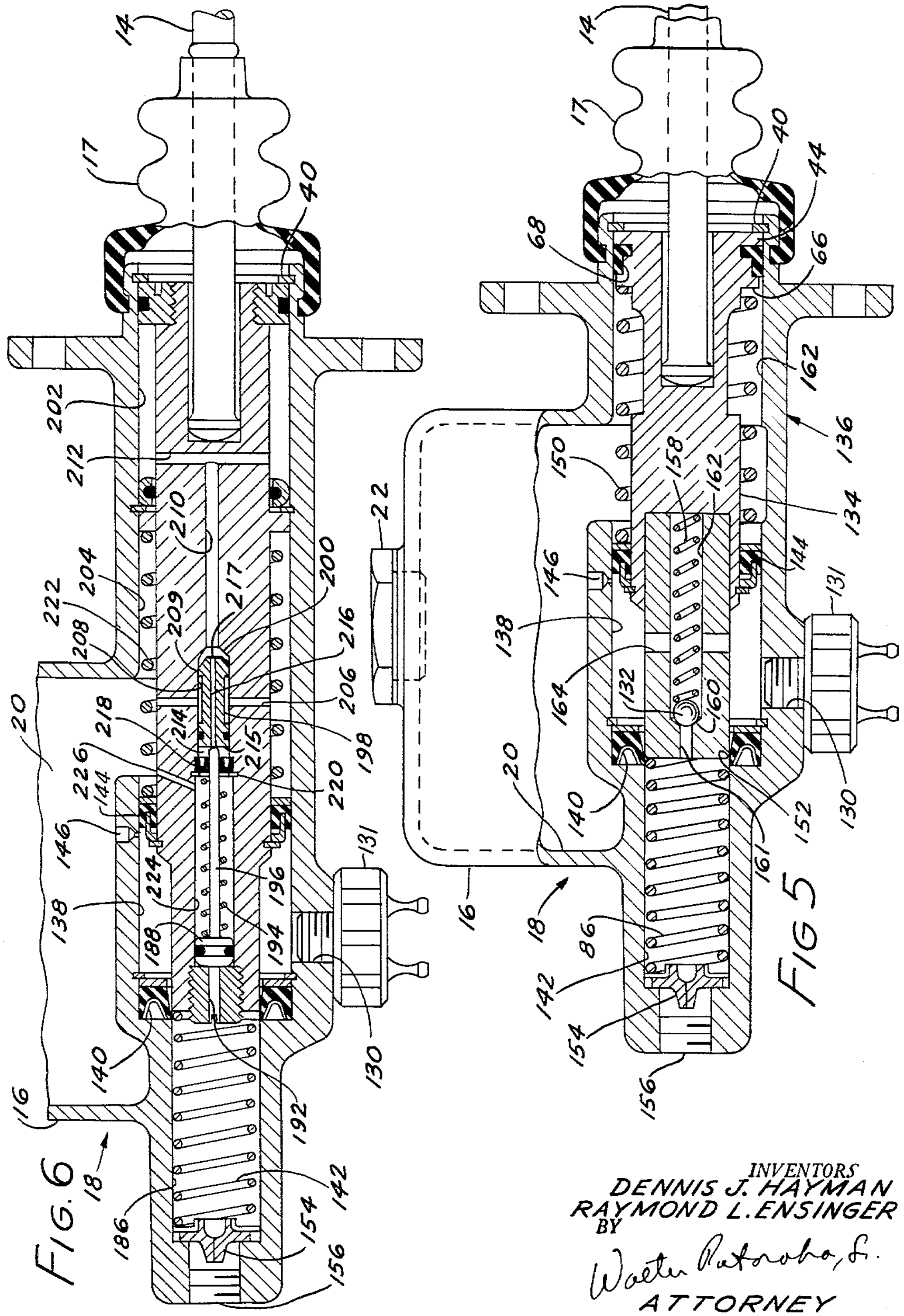

In FIGURE 5, a pressure relief valve 132 has been incorporated within the hollow piston 134. Initially, on the forward stroke of piston 134, communication between reservoir 20 and chamber 138 would be cut off by virtue of cup seal 144 moving past port 146. Fluid would be forced by the large diameter or low pressure cup seal 144 from chamber 138, through the opening between cup seal 140 and small piston end 152 and into chamber 142. Fluid from chamber 138 would continue to be forced into chamber 142 as just explained until some predetermined pressure, say 80 p.s.i., has been reached, at which time small piston end 152 will have entered chamber 142 and the forward movement of cup seal 144 would have stopped. Cup seal 140 would now prevent any return of fluid from chamber 142 past the piston 152 into chamber 138.

The above operation would have quickly taken up the slack in the system; i.e. brought the brake shoes very nearly into contact with the brake drum, as along curve OA of FIGURE 3. Thereafter, continued forward motion of piston 152 would complete the contact of the brake shoes with the drum and produce braking action, as along curve AB of FIGURE 3. While some pressure, say 500 p.s.i., would be sufficient to stop the vehicle, the pressure could safely build up to some greater predetermined value, say 800 p.s.i., at which time pressure relief valve 132 would leave its seat 160, overcoming spring 158.

When the above predetermined pressure is reached, the brakes would be locked, and any further forward movement of piston 152 would cause fluid to leave chamber 142 through port 161 to chamber 162 and thence through ports 164 to chamber 138. This would force cup seal 144 backwardly toward the foot pedal end of the cylinder 136, conceivably until spring 150 compresses to a solid state. Thereafter, a different braking rate would be in effect. This rate would be in accordance with the total piston area of the two-diameter piston 134, rather than in accordance with the smaller area only. The piston areas are in some designated ratio, say on the order of 4 to 1, thus requiring, for example, a four pound input force rather than a one pound input force in order to effect an increase of one p.s.i. in braking pressure. Looking again at FIGURE 3, this stage of the operation would be as along curve BE, or on a line parallel to original curve OA.

In summary, it would be extremely difficult for the operator to effect any additional movement of the foot pedal during this period of increased pedal effort, and the predetermined maximum pressure in the line and wheel cylinders would not be exceeded.

FIGURE 6 illustrates another modification of the invention wherein the typical transition or crossover pressure is produced in the same manner as described above for FIGURE 5. Once some predetermined maximum pressure is attained, the fluid flows through passage 192 and acts on a piston 188, slidably located in the center of two-diameter piston 190, to overcome spring 194. The extension 196 of piston 188 ultimately pushes poppet valve 198 onto seat 200, thus entrapping fluid in chamber 202. Small cup seal 218, held in place by retainer 220, prevents the fluid in chambers 202 and 214 from entering chamber 224. This fluid had entered chamber 202 from the reservoir 20 through chamber 204, ports 206, central chamber 208, longitudinal grooves or flats 209, passageway 210, and ports 212. This prevents any further forward travel of two-diameter piston 190, and the fluid in chamber 224 is displaced to reservoir 20 through port 226 while extension 196 is acting on poppet valve 198. The fluid pressure in chamber 214 is the same as that in chamber 202, there being a communicating port 216 between chamber 214 and passageway 210. Thus, it can be seen that, once seated, poppet valve 198 will be held in engagement with seat 200 by virtue of the same pressure in chambers 214 and 202 producing a greater force on the area of the larger poppet end 215 than on the smaller poppet end 217 exposed to passageway 210. Once the foot pedal is released and the pressures are relaxed, all moving parts will return to their repose positions aided by springs 142, 194 and 222.

Figure 8:
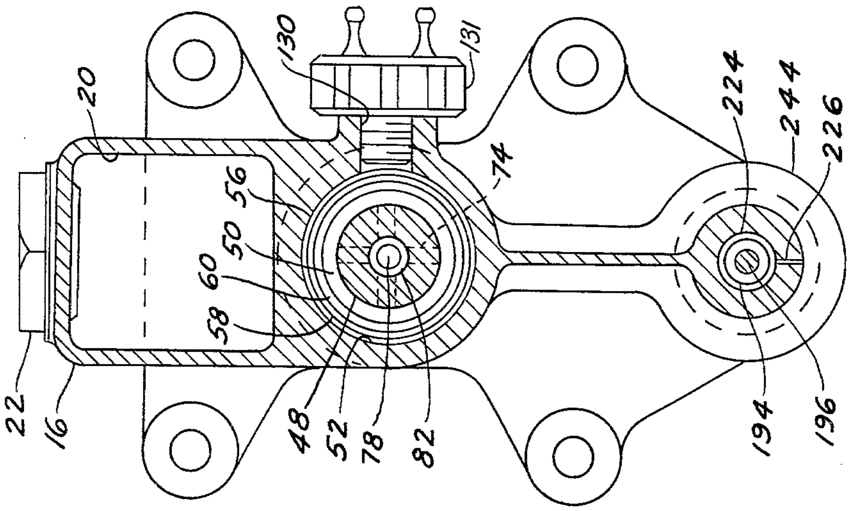
FIGURE 8 is a cross-sectional view taken on the plane of line 8—8 of FIGURE 7.
Figure 7:
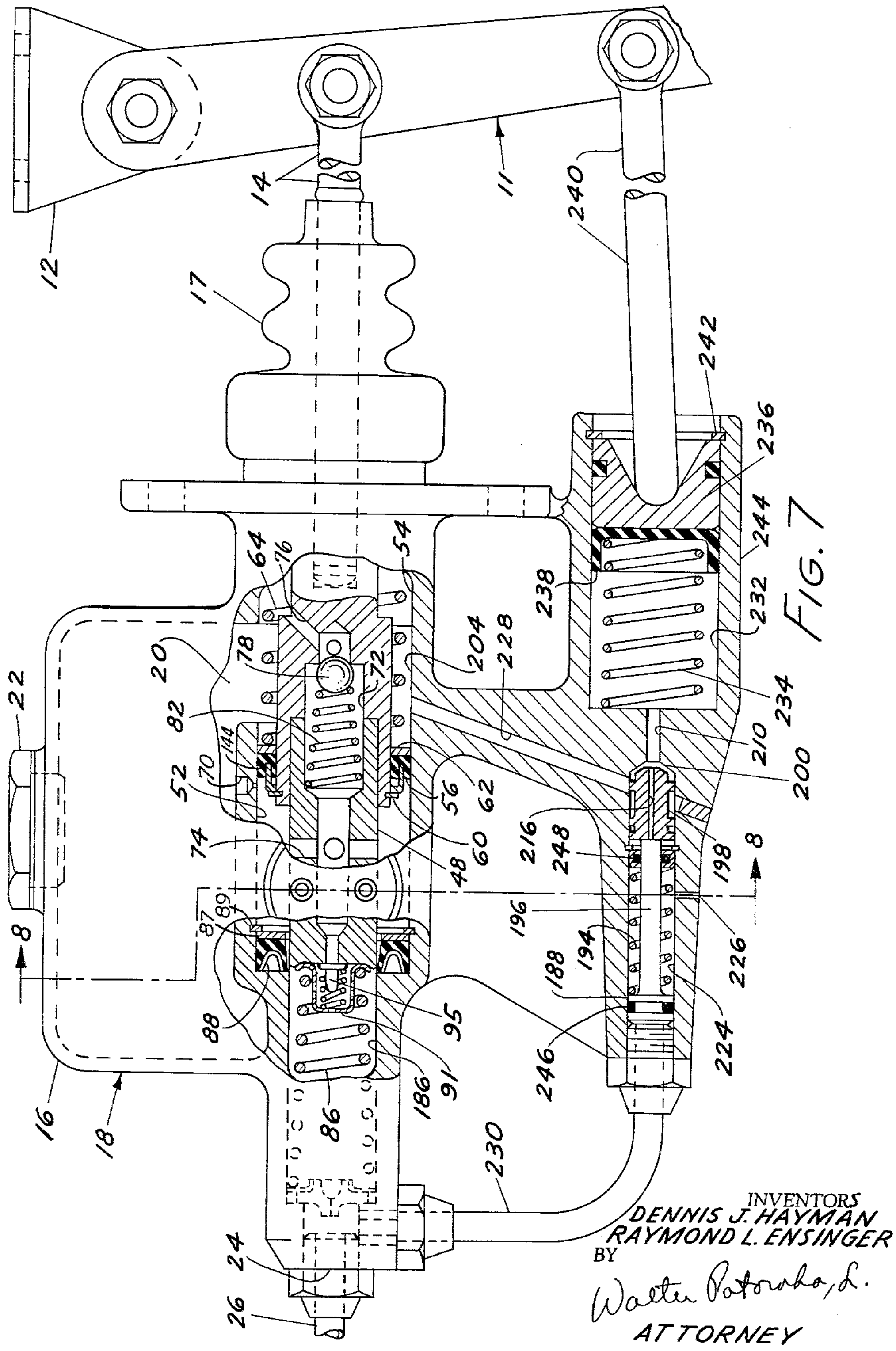

The additional modification shown by FIGURES 7 and 8 operates in the same manner as FIGURE 6, except that components 188, 194, 196, 198, 200, 210, 216, 224 and 226 are contained in a remote housing 244 communicating with the usual low and high pressure chambers 204 and 186 by means of conduits 228 and 230, respectively. One difference is that spring chamber 224 may contain air rather than fluid, it being sealed off by O-rings 246 and 248 and having port 226 communicating with the atmosphere. Chamber 232 serves the same function as chamber 202 of FIGURE 6, and a spring 234 therein serves to return piston 236, piston cup 238 and the second foot pedal lever 240 to a repose position against a retaining ring 242 in housing 244, once the foot pedal (not shown) is released.

It should be apparent from the above description of the invention, including its various modifications, that a two-stage brake master cylinder has been provided that overcomes the previously-mentioned objections to prior art two-stage master cylinders; that is, the possibility of building up excessive pressures in the second high pressure stage has been eliminated. The provision of a pressure responsive stop-light switch in the first stage, and the pressure of which is lower than the pressures encountered in presently-used single stage brake master cylinders, should reduce the frequency of switch failures, which are often not immediately detected and which can very easily cause rear-end collisions.

While five modifications of the invention have been disclosed, it is conceivable that other modifications are possible, and no limitations not recited in the appended claims are intended.

What we claim as our invention is:

1. In a hydraulic manual braking system having a foot pedal, wheel cylinders and lines thereto, a master cylinder assembly comprising a reservoir, a pair of concentric bores, a two-diameter piston slidably mounted in said bores, linkage means connecting said foot pedal to said two-diameter piston means associated with said two-diameter piston for preventing the build-up of pressure above a designated level in said lines and wheel cylinders, means for preventing said foot pedal from being depressed further once said designated pressure is attained and additional means for releasing said pressure immediately upon release of said foot pedal.

2. In a hydraulic manual braking system having wheel cylinders and lines thereto, a master cylinder assembly comprising a reservoir, a pair of concentric bores, a two-diameter piston slidably mounted in said bores, and valve means downstream of said two-diameter piston for preventing the build-up of pressure above a designated level in said lines and wheel cylinders, means for preventing further forward movement of said two-diameter piston once said designated pressure is attained and additional means for releasing said designated pressure immediately upon reduction of pressure upstream of said first mentioned means.

3. In a hydraulic manual braking system having a foot pedal, wheel cylinders and lines thereto, a master cylinder comprising a reservoir, a pair of concentric bores, a two-diameter piston slidably mounted in said bores, valve means on the high pressure side of the smaller end of said two-diameter piston suitable for preventing the build-up of pressure above a designated level in said lines and wheel cylinders due to foot pedal force, a second valve means further downstream suitable for preventing any additional build-up of pressure in said lines and wheel cylinders and separate means for releasing said pressure immediately upon release of said foot pedal.

4. In a hydraulic manual braking system having a foot pedal, wheel cylinders and lines thereto, and a stop-light pressure switch, a master cylinder comprising a reservoir, a pair of concentric bores, a two-diameter piston slidably mounted in said bores, valve means on the high pressure side of the smaller end of said two-diameter piston for preventing the build-up of pressure above a designated level in said lines and wheel cylinders due to foot pedal force, second valve means further downstream for preventing additional build-up of pressure in said lines and wheel cylinders due to other causes, an outlet on the low pressure side of the smaller end of said two-diameter piston adapted to receive said stop-light pressure switch and separate means for releasing said pressure in said lines immediately upon reduction of pressure upstream of said first mentioned valve means.

5. In a hydraulic vehicle manual braking system having a foot pedal, foot pedal lever, master cylinder actuating rod and lines leading to four wheel cylinders, a master cylinder comprising a body forming a reservoir, a pair of concentric bores, a two-diameter piston slidably mounted in said bores, means for rendering the effect of the large piston diameter inoperative during the manual depression of said foot pedal, a pair of means on the high pressure side of the small diameter end of said two-diameter piston, the first of said pair of means serving to maintain a predetermined pressure and to prevent a build-up of excess pressure in said lines due to said foot pedal depression, the second of said pair of means further downstream serving to prevent the build-up of pressure in said lines due to other causes and separate means for releasing said pressure immediately upon release of said foot pedal.

6. In a hydraulic vehicle manual braking system having a foot pedal, foot pedal lever, master cylinder actuating rod and lines leading to four wheel cylinders, a master cylinder comprising a body forming a reservoir, a pair of concentric bores, a two-diameter piston slidably mounted in said bores, means for rendering the effect of the large piston diameter inoperative during the forward movement of said two-diameter piston, a pair of valve means on the high pressure side of the small diameter end of said two-diameter piston, the first of said pair of valve means serving to maintain a predetermined pressure and to prevent a build-up of excess pressure in said lines due to the forward movement of said two-diameter piston, the second of said pair of valve means further downstream serving to prevent the build-up of pressure in said lines due to other causes and separate means for releasing said pressure in said lines immediately upon reduction of pressure upstream of said first mentioned valve means.

7. In a hydraulic vehicle manual braking system having a foot pedal, foot pedal lever, master cylinder actuating rod and lines leading to four wheel cylinders and a stop-light pressure switch, a master cylinder comprising a body forming a reservoir, a pair of concentric bores, a two-diameter piston slidably mounted in said bores, a means for rendering the effect of the large piston diameter inoperative during the manual depression of said foot pedal, a pair of valve means on the high pressure side of the small diameter end of said two-diameter piston, the first of said pair of valve means serving to maintain a predetermined pressure and to prevent a build-up of excess pressure in said lines due to said foot pedal depression, the second of said pair of valve means further downstream serving to prevent the build-up of pressure in said lines due to other causes, an outlet from said body in the low pressure side of said two-diameter piston adapted to receive said stop-light pressure switch and a third valve for releasing said pressure in said lines immediately upon reduction of pressure upstream of said first of said pair of valve means.

8. In a hydraulic vehicle manual braking system having a foot pedal, foot pedal lever, master cylinder actuating rod, lines leading to four wheel cylinders and a stop-light pressure switch, a master cylinder comprising a body forming a reservoir, a pair of concentric bores, a two-diameter piston slidably mounted in said bores, means for rendering the effect of the large piston diameter inoperative during the forward movement of said two-diameter piston, a pair of valve means on the high pressure side of the small diameter end of said two-diameter piston, the first of said pair of valve means serving to maintain a predetermined pressure and to prevent a build-up of excess pressure in said lines due to forward movement of said two-diameter piston, the second of said pair of valve means further downstream serving to prevent the build-up of pressure in said lines due to other causes, an outlet from said body in the low pressure side of said two-diameter piston adapted to receive said stop-light pressure switch and a third valve for releasing said pressure in said lines immediately upon retraction of said two-diameter piston.

9. In a hydraulic vehicle manual braking system having a foot pedal, foot pedal lever actuating rod, and lines leading to wheel cylinders, a master cylinder having a body comprising a reservoir, a pair of concentric bores forming high and low pressure chambers, openings connecting said low pressure chamber with said reservoir, a cup piston and a seal piston and a two-diameter piston rod all being slidably mounted in said bores, the larger diameter also being slidably mounted in said cup piston, a first check valve downstream of the small diameter end of said two-diameter piston rod, a passageway through said two-diameter piston rod communicating with said low pressure chamber around the large diameter section of said two-diameter piston rod and with said high pressure chamber downstream of the small diameter section of said two-diameter piston rod, a second check valve and spring in said passageway, a seal surrounding said high pressure chamber, a preload spring surrounding the larger diameter of said two-diameter piston rod mounted between said cup piston and a shoulder on said two-diameter piston rod, a third spring in said high pressure chamber, a third check valve at the outlet of said high pressure chamber, a pressure limiting valve downstream of said third check valve, said pressure limiting valve limiting the pressure without relieving fluid back to said reservoir, a conduit connecting said third check valve and said pressure limiting valve, a discharge port, and a second conduit connecting said pressure limiting valve and said discharge port.

10. In a hydraulic vehicle manual braking system having a foot pedal, foot pedal lever actuating rod, a stop-light pressure switch, and lines leading to wheel cylinders, a master cylinder, said master cylinder comprising a body having a reservoir, a pair of concentric bores forming high and low pressure chambers, openings connecting said low pressure chamber with said reservoir, a cup piston and a seal piston and a two-diameter piston rod all slidably mounted in said bores, the larger diameter also being slidably mounted in said cup piston, a first check valve downstream of the small diameter end of said two-diameter piston rod, a passageway through said two-diameter piston rod communicating with said low pressure chamber around the large diameter section of said two-diameter piston rod and with said high pressure chamber downstream of the small diameter section of said two-diameter piston rod, a second check valve and spring in said passageway, a seal surrounding said high pressure chamber, a preload spring surrounding the larger diameter of said two-diameter piston rod mounted between said cup piston and a shoulder on said two-diameter piston rod, a third spring in said high pressure chamber, a third check valve at the outlet of said high pressure chamber, a pressure limiting valve downstream of said third check valve, said pressure limiting valve limiting the pressure without relieving fluid back to said reservoir, a conduit connecting said third check valve and said pressure limiting valve, a discharge port, a second conduit connecting said pressure limiting valve and said discharge port, and an outlet from said low pressure chamber adapted to receive said stop-light pressure switch.

11. In a hydraulic braking system including a foot pedal, a foot pedal lever, a master cylinder actuating rod and hydraulic lines leading to four wheel cylinders, a master cylinder comprising a body formed to provide a reservoir, a pair of concentric bores having different diameters, a two-diameter piston slidably mounted in said bores, means for rendering the effect of the large piston diameter inoperative during the forward movement of said two-diameter piston, valve means on the high pressure side of the small diameter end of said two-diameter piston, said valve means serving to maintain a predetermined pressure without bleeding fluid back to said reservoir and to prevent a build-up of excess pressure in said lines due to the forward movement of said two-diameter piston, said valve means including a valve, a valve seat and a spring biasing said valve away from said seat and additional means for releasing said excess pressure immediately upon release of said foot pedal.

12. In a hydraulic braking system including a foot pedal lever, a master cylinder actuating rod and lines leading to wheel cylinders, a master cylinder comprising a body formed to provide a reservoir, a pair of concentric bores having different diameters, a two-diameter piston slidably mounted in said bores, means for rendering said large piston diameter inoperative during the forward movement of said two-diameter piston, valve means on the high pressure side of the small diameter end of said two-diameter piston, said valve means serving to maintain a predetermined pressure without bleeding fluid back to said reservoir and to prevent a build-up of excess pressure in said lines due to the forward movement of said two-diameter piston, a plurality of ports communicating between said reservoir and said pair of concentric bores, means for eliminating all communication between the smaller of said pair of concentric bores and said reservoir once a predetermined pressure has been attained in said lines and additional means for releasing said excess pressure immediately upon retraction of said two-diameter piston.

13. In a hydraulic braking system having a foot pedal lever, a master cylinder actuating rod and lines leading to wheel cylinders, a master cylinder comprising a body formed to provide a reservoir; a pair of concentric bores having different diameters; a two-diameter piston slidably mounted in said bores; means for rendering said large piston diameter inoperative during the forward movement of said two-diameter piston; valve means on the high pressure side of the small diameter end of said two-diameter piston; said valve means serving to maintain a predetermined pressure without bleeding fluid back to said reservoir and to prevent a build-up of excess pressure in said lines due to the forward movement of said two-diameter piston, said valve means comprising a valve, a valve seat, and a spring biasing said valve away from said seat; a port communicating between said reservoir and the larger of said pair of concentric bores, means for eliminating said communication with said reservoir while said valve is seated against said valve seat and additional means for releasing said excess pressure immediately upon a reduction of pressure upstream of said valve means.

References Cited by the Examiner

UNITED STATES PATENTS

| | | | |
|---|---|---|---|
| 150,502 | 5/74 | Adams | 137—505.18 |
| 1,454,397 | 5/23 | MacDonald | 60—54.6 X |
| 2,166,742 | 7/39 | Lambert | 60—54.6 X |
| 2,317,604 | 4/43 | Hamilton | 60—54.6 X |
| 2,820,347 | 1/58 | Highland et al. | 60—54.6 |
| 2,835,271 | 5/58 | Oberthur | 137—505.13 |
| 3,062,010 | 11/62 | Krusemark | 60—54.6 |
| 3,115,154 | 12/63 | Dillon | 137—493.8 |

FOREIGN PATENTS

| | | |
|---|---|---|
| 101,680 | 7/37 | Australia. |
| 1,062,138 | 12/53 | France. |

JULIUS E. WEST, *Primary Examiner.*

ROBERT R. BUNEVICH, *Examiner.*